(12) United States Patent
Mak et al.

(10) Patent No.: US 11,559,823 B2
(45) Date of Patent: Jan. 24, 2023

(54) VOLUMETRIC MEASUREMENT AND REGULATION DEVICE INCORPORATED IN A TIME-PRESSURE DISPENSER

(71) Applicant: ASMPT SINGAPORE PTE. LTD., Singapore (SG)

(72) Inventors: Kuok Hang Mak, Hong Kong (HK); Tsz Kit Yu, Hong Kong (HK); Chun Ting Lau, Hong Kong (HK); Wai Keung Tam, Hong Kong (HK); Ka Shing Kwan, Hong Kong (HK)

(73) Assignee: ASMPT SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/025,125

(22) Filed: Sep. 18, 2020

(65) Prior Publication Data
US 2022/0088633 A1    Mar. 24, 2022

(51) Int. Cl.
*B05C 5/02* (2006.01)
*G01F 11/02* (2006.01)
*B05C 11/10* (2006.01)

(52) U.S. Cl.
CPC ........ *B05C 5/0225* (2013.01); *B05C 11/1034* (2013.01); *G01F 11/027* (2013.01)

(58) Field of Classification Search
CPC ............. A61M 5/14546; B05C 5/0225; B05C 11/1034; B05C 11/002; B05C 5/02; G01F 11/027

USPC ............................................ 222/38; 600/432
See application file for complete search history.

(56) References Cited

U.S. PATENT DOCUMENTS

| | | | | |
|---|---|---|---|---|
| 5,452,824 A * | 9/1995 | Danek | ................. | B05C 11/1034 222/263 |
| 5,662,612 A * | 9/1997 | Niehoff | ............. | A61M 5/14546 604/155 |
| 5,964,381 A * | 10/1999 | El-Hage | .................. | B01L 3/022 222/135 |
| 6,179,569 B1 * | 1/2001 | Kojima | ............. | A61M 5/14526 417/63 |
| 8,708,957 B2 * | 4/2014 | Jespersen | .......... | A61M 5/31525 604/135 |
| 2003/0132243 A1 * | 7/2003 | Engel | ................... | H05K 13/046 222/61 |
| 2004/0140371 A1 * | 7/2004 | Engel | ................. | B05C 11/1034 239/145 |

* cited by examiner

*Primary Examiner* — Vishal Pancholi
*Assistant Examiner* — Robert K Nichols, II
(74) *Attorney, Agent, or Firm* — Ostrolenk Faber LLP

(57) ABSTRACT

A device for measuring and regulating a volume of a fluid dispensed by a time-pressure dispenser, the device comprising: an adaptor for releasably coupling a syringe to the device, the syringe containing a fluid to be dispensed; a probe configured to be coupled with a piston of the syringe, the piston being operative to apply a pressure for ejecting the fluid from the syringe upon the application of an air pressure to the piston; and a displacement detector operative in use to determine a position of the probe so as to determine a position of the piston when dispensing the fluid, whereby to regulate the volume of the fluid dispensed from the syringe.

20 Claims, 8 Drawing Sheets

VOLUMETRIC MEASUREMENT AND REGULATION DEVICE INCORPORATED IN A TIME-PRESSURE DISPENSER

FIELD OF THE INVENTION

The invention relates to an adaptor device, a fluid dispensing apparatus and a method for regulating a volume of a fluid dispensed by a time-pressure dispenser.

BACKGROUND

The manufacture of electronics products requires high quality and reliability during the manufacturing process. In particular, process accuracy and consistency are important for semiconductor assembly and packaging equipment. One manufacturing process utilizes equipment for carrying out dispensing of fluid such as an adhesive. Typically, a time-pressure dispenser is utilized for depositing fluid, such as an adhesive. This is because time-pressure dispensers are versatile and can perform a wide range of dispensing applications as well as being operator-friendly for straightforward handling and operation compared to other types of dispenser. However, some problems may be encountered when using time-pressure dispensers for the delivery of fluid such as epoxy.

It would be beneficial to provide an improved device for dispensing fluid as compared to the prior art.

SUMMARY OF THE INVENTION

Thus, it is an object of the invention to seek to provide a device which overcomes at least some of the problems with the prior art.

According to a first aspect of the present invention, there is provided a device for measuring and regulating a volume of a fluid dispensed by a time-pressure dispenser, the device comprising: an adaptor for releasably coupling a syringe to the device, the syringe containing a fluid to be dispensed; a probe configured to be coupled with a piston of the syringe, the piston being operative to apply a pressure for ejecting the fluid from the syringe upon the application of an air pressure to the piston; and a displacement detector operative in use to determine a position of the probe so as to determine a position of the piston when dispensing the fluid, whereby to measure and regulate the volume of the fluid dispensed from the syringe.

The first aspect recognizes that a problem with using time-pressure dispensers to dispense an amount of fluid such as epoxy is that sometimes those devices are subject to a non-negligible variation in the volume dispensed, typically due to inconsistencies in the dispenser itself and also due to changes in fluid properties over time. These time-pressure dispensers are not volumetric devices, as only time and pressure can be controlled by the dispenser. Ensuring time and pressure is typically insufficient to achieve accurate and repeatable dispensing because the correlation to fluid volume or flow rate using time and pressure can be weak and unreliable. Other factors such as viscosity and nozzle conditions can also affect dispensing accuracy and consistency. As such, time-pressure dispensers are unable to adjust themselves adaptively to correct any error in volume because they are not volumetric dispensers. This can lead to shortcomings in the accuracy and consistency of the volume of fluid dispensed. Accordingly, a device is provided. The device may regulate or control a volume or amount of a fluid dispensed by a time-pressure dispenser. The device may comprise an adapter. The adapter may releasably couple a syringe to the device. The syringe may contain a fluid to be dispensed. The device may comprise a probe. The probe may be configured to couple with a piston of the syringe. The piston may apply a pressure which ejects or causes the fluid to flow from the syringe when pressure is applied to the piston. The device may comprise a displacement detector. The displacement detector may determine or measure a position of the probe. The position of the probe may determine a position of the piston when dispensing the fluid. The position of the piston when dispensing the fluid may then be used to measure and regulate the volume of the fluid dispensed from the syringe. In this way, the device effectively converts an existing time-pressure dispenser into a volumetric dispenser which can be used to measure and regulate the volume of the fluid dispensed from the syringe by determining the position of the piston from the position of the probe. This provides for consistent and reliable dispensing of fluid even during inconsistency of the dispenser itself and even when properties and conditions of the fluid change over time.

The probe may be configured to be coupled towards one end of the piston distal from a nozzle of the syringe.

The probe may be in releasable engagement with the piston.

The probe may be operative in use to displace linearly in tandem with the piston. The probe may carry one of a displacement encoder and a displacement scale.

The probe may be moveably housed within a housing which carries another of the displacement encoder and the displacement scale.

The displacement detector may be operative in use to measure the displacement of the probe in response to displacement of the displacement encoder with respect to the displacement scale.

The displacement encoder may be a linear displacement encoder and the displacement scale may be a linear displacement scale.

The device may comprise processing logic operative in use to record an indication of the displacement over time of the probe when the piston is dispensing the fluid as a displacement characteristic.

The processing logic may be operative in use to determine the volume of the fluid dispensed by the syringe based on a difference between an initial position of the probe prior to the fluid being dispensed by the syringe and a resultant position of the probe after the fluid has been dispensed by the syringe.

The processing logic may be operative in use to compare a displacement characteristic of the probe with a pre-stored displacement characteristic of the probe in relation to a typical dispensing cycle.

The processing logic may be operative in use to detect a dispensing irregularity when the displacement characteristic of the probe varies from the pre-stored displacement characteristic of the probe.

The housing may comprise an additional actuator operative in use to apply an air pressure on the probe, so as to apply a further pressure to the piston for ejecting the fluid from the syringe.

According to a second aspect of the present invention, there is provided a fluid dispensing apparatus, comprising a time-pressure dispenser operative in use to dispense a fluid; and the device of the first aspect.

The fluid dispensing apparatus may comprise the features of the device of the first aspect mentioned above.

According to a third aspect of the present inventions, there is provided a method of measuring and regulating a volume of a fluid dispensed by a time-pressure dispenser, the method comprising: using an adaptor to releasably couple a probe with a piston of a syringe containing a fluid to be dispensed; applying an air pressure to the piston so as to apply a pressure on the fluid for ejecting the fluid from the syringe; and regulating the volume of the fluid dispensed from the syringe by determining a displacement of the probe with a displacement detector so that a position of the piston when the piston is dispensing the fluid may be determined.

The method may comprise recording an indication of the displacement over time of the probe when the piston is dispensing the fluid.

The method may comprise determining the volume of the fluid dispensed by the syringe based on a difference between an initial position of the probe prior to the fluid being dispensed by the syringe and a resultant position of the probe after the fluid has been dispensed by the syringe.

The method may comprise comparing a displacement characteristic of the probe with a pre-stored displacement characteristic of the probe in relation to a typical dispensing cycle.

The method may comprise detecting a dispensing irregularity when the displacement characteristic of the probe varies from the pre-stored displacement characteristic of the probe.

The method may comprise recording the displacement characteristic providing an indication of the displacement of the probe with time during displacement of the piston when dispensing the fluid.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION

Before discussing embodiments in any more detail, first an overview will be provided. Some embodiments provide an adaptor device which measures and regulates or controls a volume of fluid which is being dispensed by a time-pressure dispenser. The device releasably couples with a syringe which contains the fluid to be dispensed, as well as to the time-pressure dispenser which actuates the piston of the syringe. The adaptor device has a probe which couples with a piston of the syringe and with a displacement detector which measures the displacement of the syringe during actuation. By measuring the displacement of the piston of the syringe, the volume of fluid dispensed can be determined. Furthermore, by analysing the displacement of the syringe over time during actuation and comparing this against pre-stored information, various fault conditions relating to operation of the syringe can be determined.

Device

Figure 1:
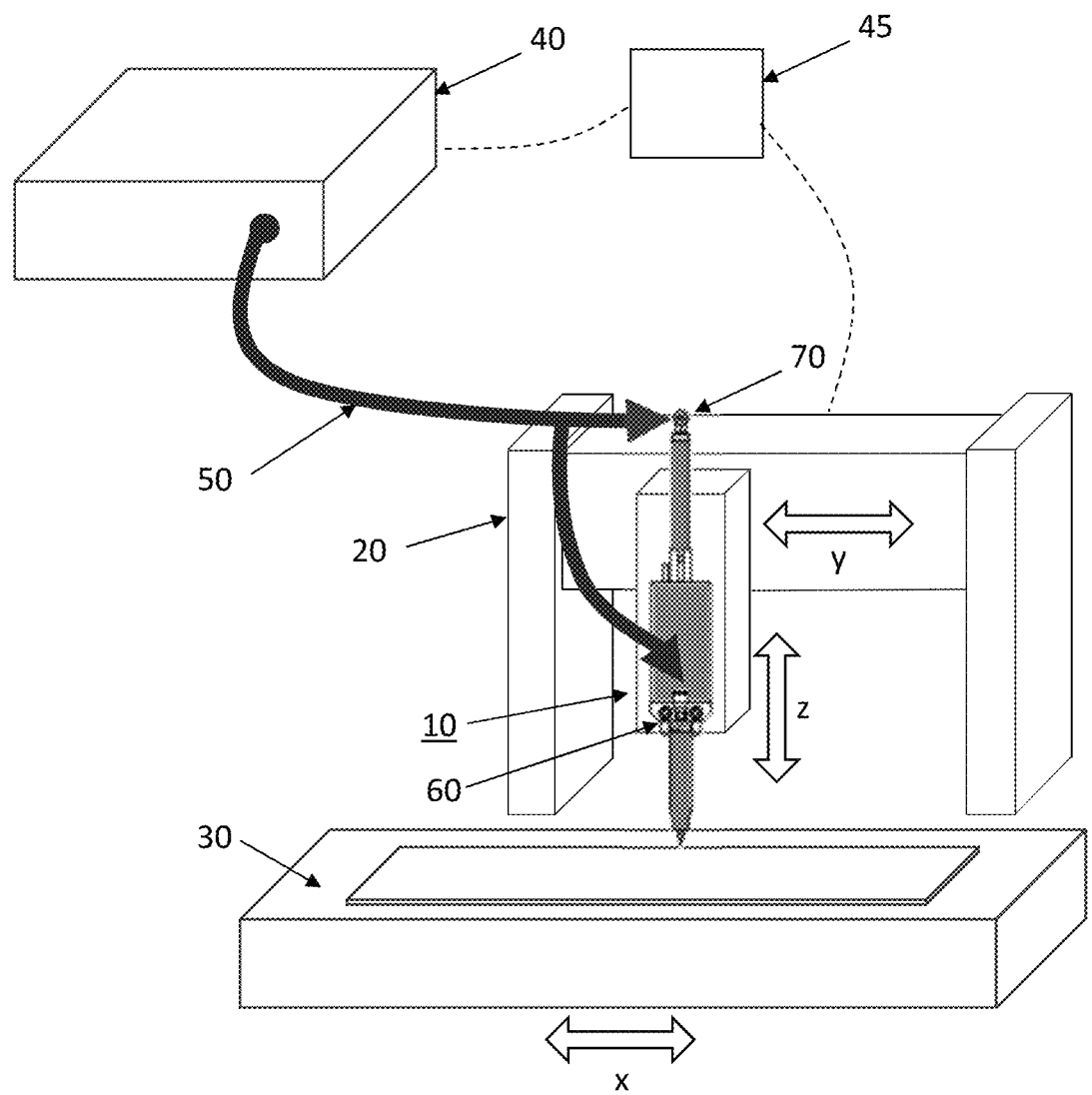
FIG. 1 illustrates an adaptor device according to the preferred embodiment of the invention, which is connected to a time-pressure dispenser.

FIG. 1 illustrates an adaptor device 10 according to one embodiment. The device 10 is fitted to a dispensing machine 20 which provides for three degrees of freedom of motion of the device 10 with respect to a positioning table 30 which carries components (not shown) onto which a fluid, such as an epoxy resin or other fluid, is to be dispensed.

The device 10 is coupled with a time-pressure dispenser 40 via flexible air tubes 50. In this example, the time-pressure dispenser 40 is pneumatic and provides air over the flexible air tubes 50. However, it will be appreciated that different types of time-pressure dispensers are possible, such as a hydraulic dispenser, an electromechanical linear actuator dispenser, a piezo motor dispenser, or indeed any time-pressure dispenser which can be used to operate the piston of the syringe. In this example, the flexible air tubes 50 are coupled with a proximal coupling 60 as well as a distal coupling 70, as will be explained in more detail below.

A controller 45 couples with and controls the device 10, the time-pressure dispenser 40 and the dispensing machine 20 as will be explained in more detail below.

Figure 2:
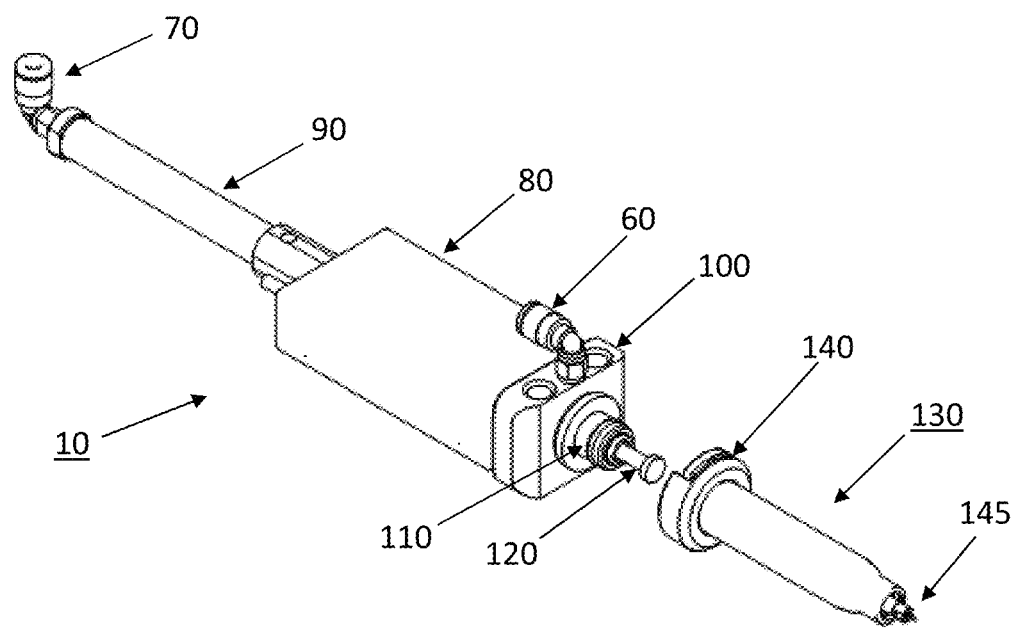
FIG. 2 is a perspective view of the device before a syringe is mounted.

FIG. 2 illustrates the device 10 in more detail. The device 10 has a housing 80 coupled with an air cylinder 90 which terminates at the distal coupling 70. The proximal coupling 60 is retained by an end wall 100 coupled with the housing 80. The end wall 100 has a syringe retaining ring 110. A probe, in the form of a probe rod 120, is coaxially located to extend from the syringe retaining ring 110.

Figure 3:
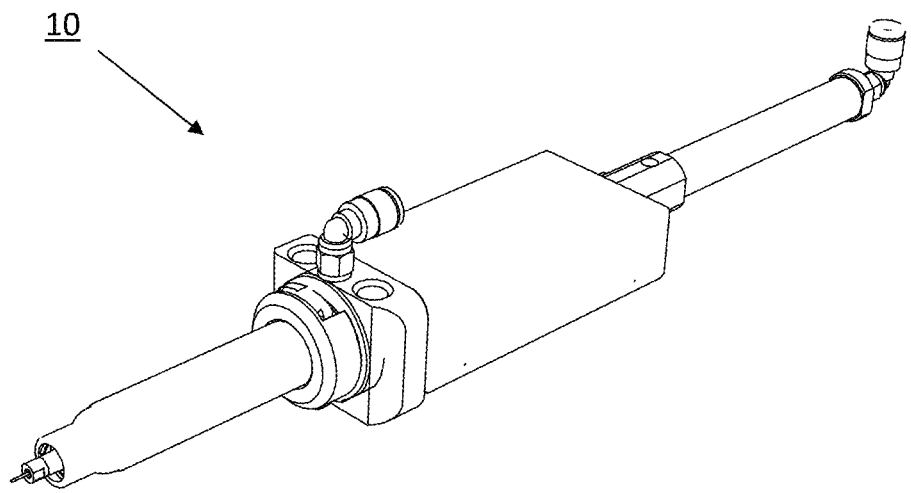
FIG. 3 illustrates the device with the syringe mounted onto the device.

Syringe 130 has a complementary syringe mounting ring 140 which cooperates with the syringe retaining ring 110 to hold the syringe 130 in place, abutting the end wall 100, as shown in FIG. 3. The syringe 130 has a nozzle 145 through which the fluid is dispensed. When retained on the device 10, the probe rod 120 extends within the syringe 130 and cooperates with a piston (not shown).

Figure 4A:
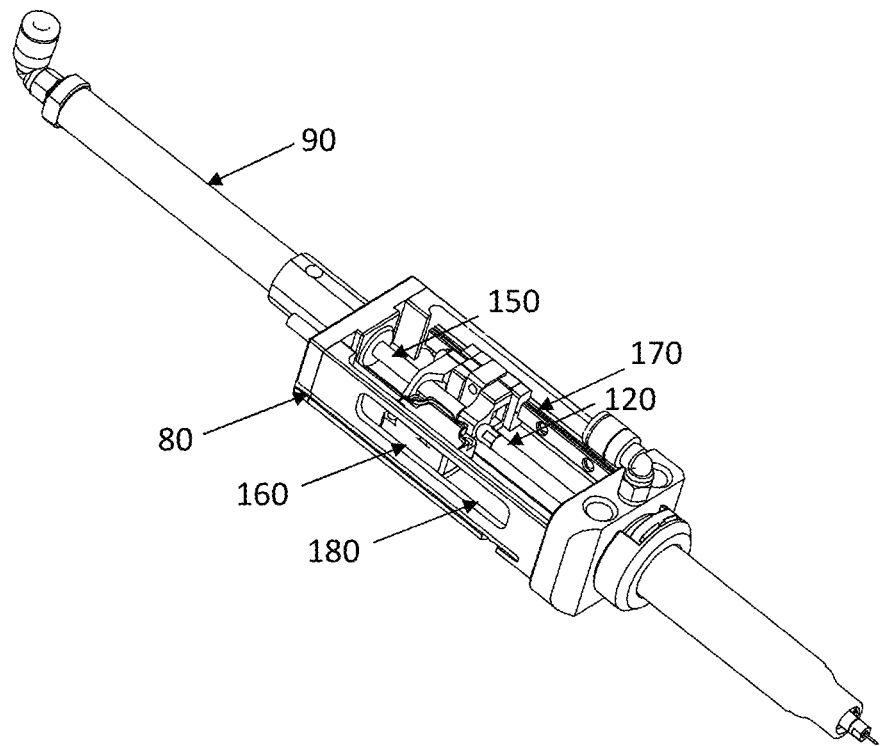
FIGS. 4A and 4B illustrate perspective and side views respectively of the arrangement within a housing of the device in more detail.
Figure 4B:
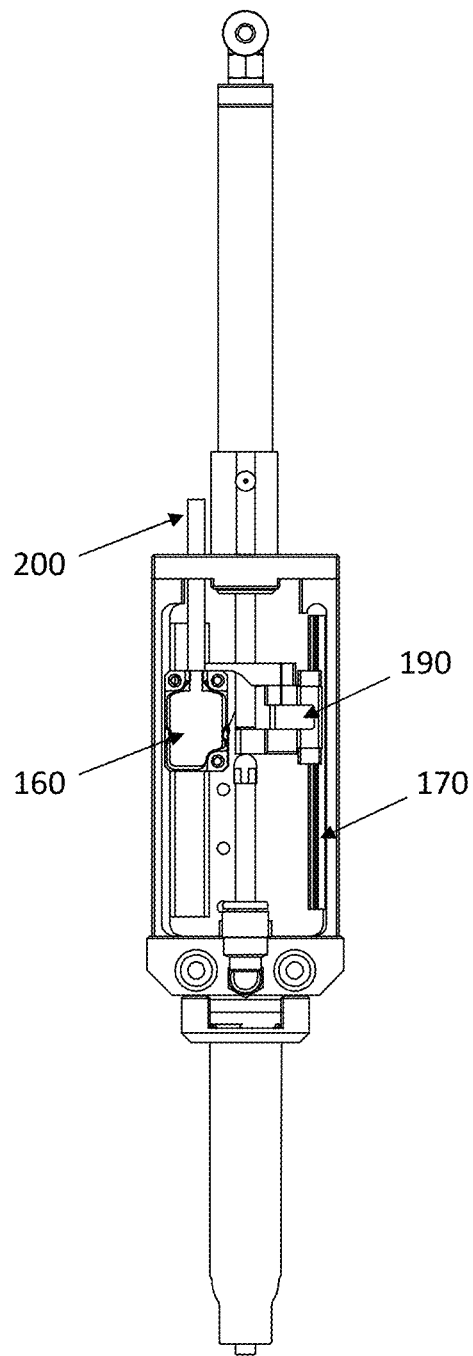

FIGS. 4A and 4B illustrate perspective and side views respectively of the arrangement within the housing 80 in more detail. An air cylinder rod 150 extends from the air cylinder 90 and engages with a linear position sensor 160 carried by a linear guideway 170. Positioned proximate to the linear position sensor 160 is a linear scale 180 which extends within the housing 80, parallel to the linear guideway 170. Coupled with the linear position sensor 160 is the probe rod 120. As can be seen in more detail in FIG. 4B, the linear position sensor 160 is located on a mounting 190 which engages with the linear guideway 170. The linear position sensor 160 has a cable 200 which carries information about the position of the linear position sensor 160 with respect to the linear scale 180.

Figure 5A:
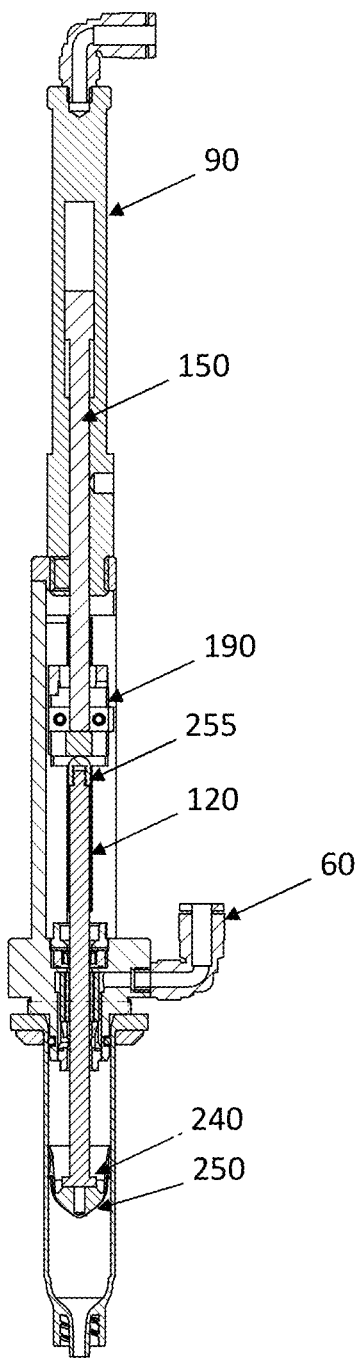
FIG. 5A is a sectional view showing the arrangement of the device in more detail and FIG. 5B is a sectional view of a proximal coupling portion of the device.
Figure 5A:
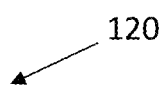
Figure 5B:
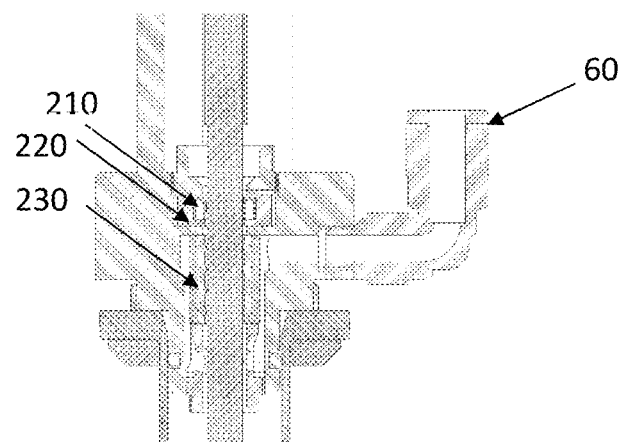

FIG. 5A is a sectional view showing the arrangement of the device 10 in more detail, and FIG. 5B is a sectional view of a proximal coupling 60 portion of the device 10. A rod seal 210 and an O-ring 220 help to fluidly isolate the void within the housing 80 from air provided through the proximal coupling 60. A linear bushing 230 helps to maintain the axial alignment of the probe rod 120 during actuation. A proximal end 240 of the probe rod 120 engages with a syringe piston 250 and a distal end 255 of the probe rod 120 engages with the mounting 190.

Fluid Dispensing

In operation, the control logic 45 actuates the dispensing machine 20 to locate the nozzle 145 at the required position with respect to a component on the table 30.

Once in position, the control logic 45 activates the time-pressure dispenser 40. The control logic receives and records position information indicating the position of the piston 250 from the linear position sensor 160, via the cable 200. The time-pressure dispenser supplies air at a selected air pressure over the flexible air tubes 50 for a selected time-period. The air pressure is supplied primarily through the proximal coupling 60, with air being supplied via the distal coupling 70 for added air pressure assistance. Air supplied via the proximal coupling 60 enters the syringe 130 and provides a pushing force to displace the syringe piston 250 towards the nozzle 145.

Air that is supplied via the distal coupling 70 enters the air cylinder 90 and also causes a displacement of the air cylinder rod 150 towards the syringe 130, which in turn pushes against the probe rod 120 to assist in forcing the displacement of the syringe piston 250.

Movements of the air cylinder rod 150 and the probe rod 130 translate to movement of the syringe piston 250 via the coupling between the air cylinder rod 150, the encoder mounting 190 and the probe rod 120. The introduction of air pressure being supplied via the distal coupling 70 assists in driving displacement of the syringe piston 250. The linear position sensor 160 reads its position with respect to the linear scale 180 and periodically or continuously outputs that position via the cable 200 to the control logic 45 which records this positional information before, during and after actuation by the time-pressure dispenser 40 for analysis.

Hence, in typical operation, the probe rod 120 extends and touches against the piston 250 to record its dynamics. While the probe rod 120 may initially be out of contact with the syringe piston 250, just before the dispensing starts, the actuation provided by the time-pressure dispenser 40 will cause the probe rod 120 to make contact with the syringe piston 250. The probe rod 120 then contacts the syringe piston 250 firmly with the aid of the actuation from the time-pressure dispenser 40. The time history of linear displacement is then recorded during the entire dispensing cycle. When the dispensing cycle ends, the actuation of the adaptor device 10 will stop. The displacement-time waveform is then processed and used to calculate the dispensed volume, together with providing an indication of any out of range or undesired conditions. That information can then be used as a closed feedback loop to alter the operation time and/or pressure of the time-pressure dispenser 45 in the next dispensing cycle.

FIGS. 6A to 6D show exemplary positional information recorded by the control logic 45 under different operating conditions.

Normal Operation

Figure 6A:
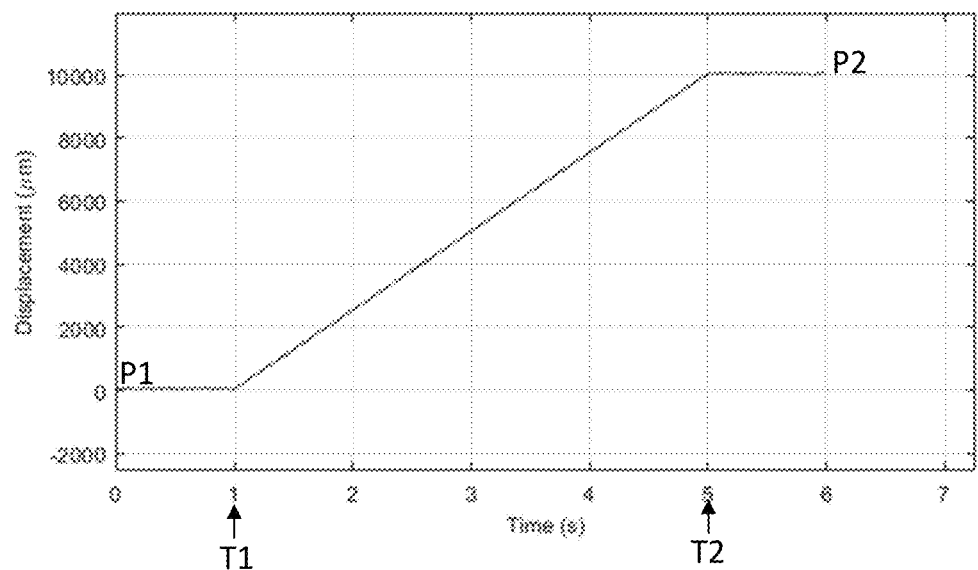
FIGS. 6A to 6D show exemplary positional information recorded by the control logic under normal operation, in the presence of air bubbles, when there are blockages and when there is output non-uniformity, respectively.

FIG. 6A shows normal operation of the syringe. The starting position P1 of the piston 250 is recorded and the time-pressure dispenser 40 is actuated. At time T1, movement of the syringe piston 250 occurs, and its displacement will gradually increase while fluid is being dispensed from the syringe 130. The time-pressure dispenser 40 is deactivated at time T2, and the syringe 130 then reaches a steady-state position P2.

The difference between the positions P1 and P2, together with knowledge of the geometry of the syringe 130, enables the control logic 45 to determine the amount of fluid dispensed by the syringe 130.

Air Bubbles

Figure 6B:
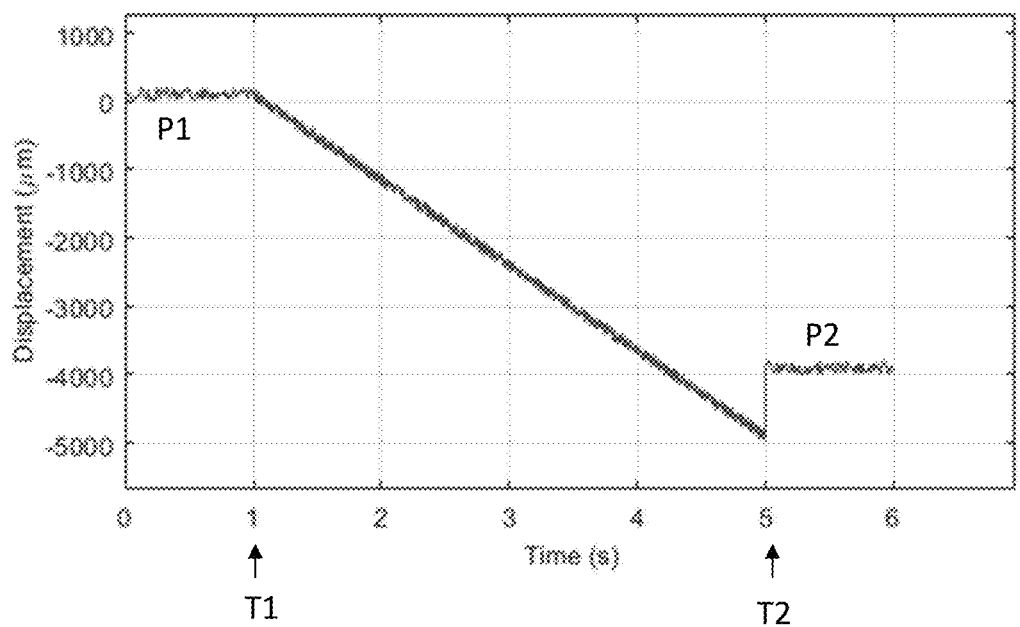

FIG. 6B shows an exemplary recorded positional data when air bubbles are present in the fluid within the syringe 130. As can be seen, the initial position of the syringe piston 250 is P1. The control logic 45 activates the time-pressure dispenser 40, and at time T1, the piston 250 responds differently in the presence of air bubbles and may even be forced into a negative displacement. At time T2, the piston 250 suddenly displaces forwards at high velocity once some air bubbles are discharged from the syringe 130, right after the control logic 45 deactivates the time-pressure dispenser 40 and the final position P2 of the syringe piston 250 is reached. The final position P2 may be even lower than the starting position P1. From this, the control logic 45 can determine that air bubbles are present and optionally provides an indication to the operator of the abnormality encountered during dispensing.

Blockages

Figure 6C:
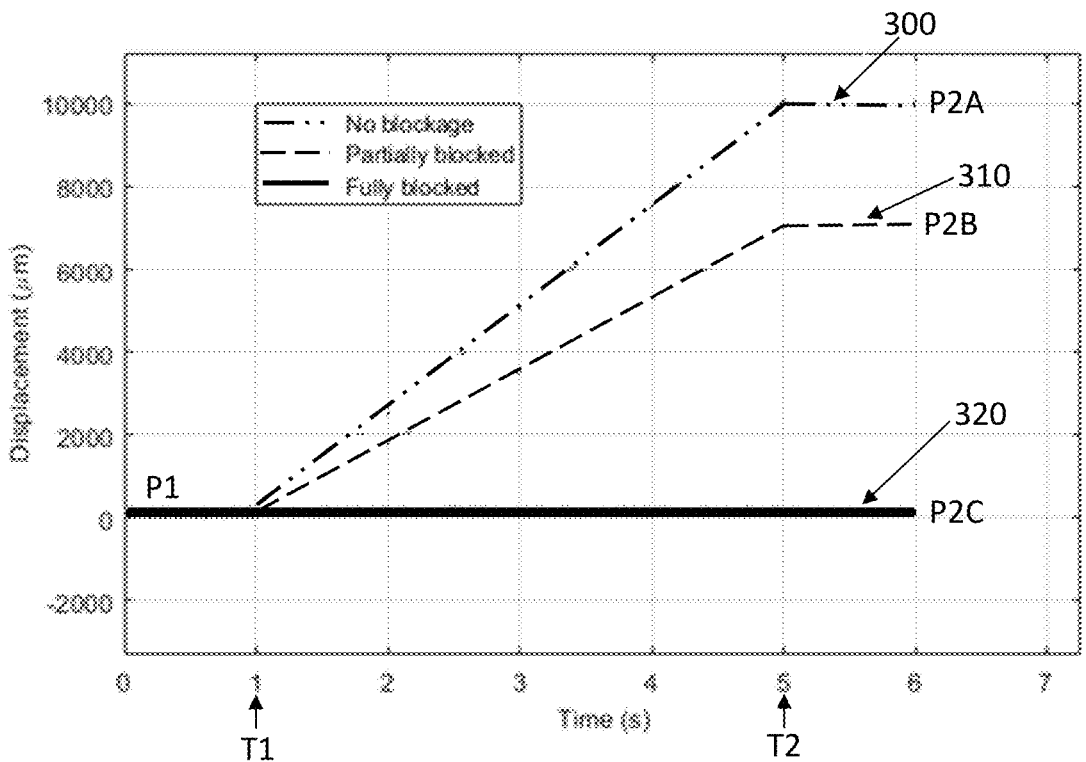

FIG. 6C illustrates different collected positional information under different blockage conditions, with line 300 showing a normal operating condition of the nozzle 145, line 310 showing a partial blockage of the nozzle 145 and line 320 showing a fully blocked nozzle 145. As can be seen, in each situation the starting position P1 of the syringe piston 250 is the same and, at time T1, the syringe piston 250 should move in response to activation of the time-pressure dispenser 40. Where the nozzle 145 does not have blockage or is only partially blocked, the syringe piston 250 is able to move in both instances, but under normal operating conditions (shown in line 300) the rate of displacement is higher than in a partially blocked condition. Also, the resultant resting position following time T2, when the time-pressure dispenser 40 is deactivated, is higher under normal operating conditions (shown in line 300) than for the partially blocked (line 310) condition. The control logic 45 can determine that there are such blockages by analysing the profile of the line 310 and comparing it to line 300 which may be pre-stored within the control logic 45. Similarly, a reduction in the resultant position shown by P2B compared to P2A can also indicate blockage. Moreover, if the nozzle 145 is fully blocked, the syringe piston 250 may not be able to move at all, such that its resultant position is shown by P2C, wherein there has been no displacement by the syringe piston 250. The control logic 45 can optionally provide an indication of such blockages to the operator.

Nozzle Output Non-Uniformity

Figure 6D:
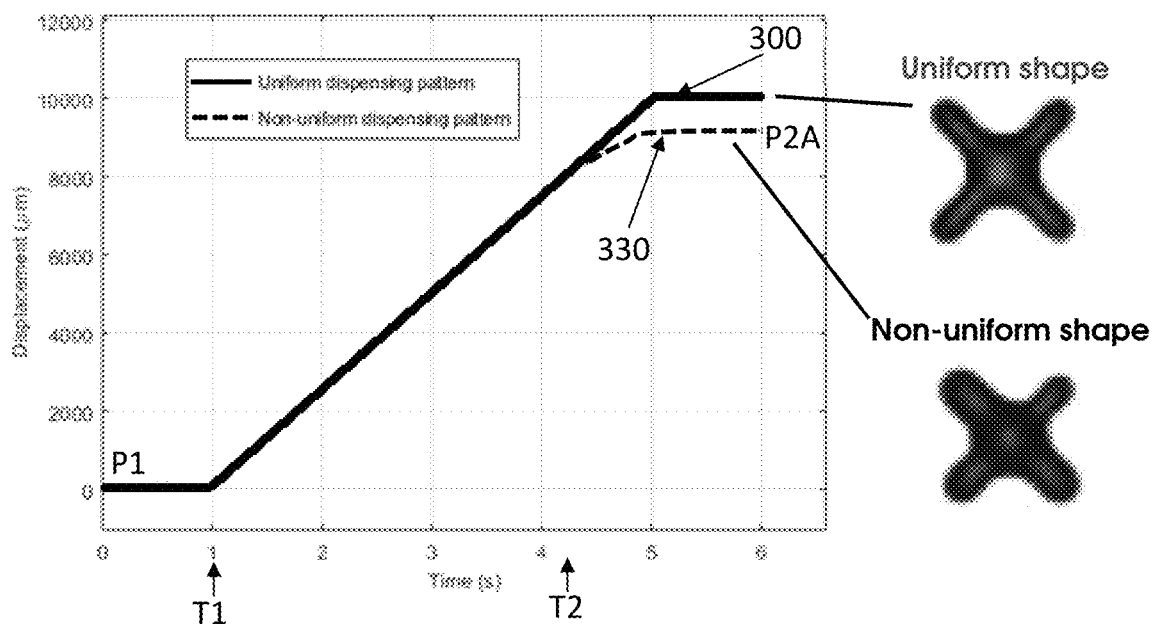

FIG. 6D illustrates a condition where a pattern dispensed by the nozzle 145 has a non-uniform shape. Although the line 330 (representing a non-uniform dispensing pattern) has a similar initial profile as line 300 (representing a uniform dispensing pattern), it can be seen that the line 330 has a reduced peak displacement P2A, from which a non-uniform output of the nozzle 145 can be deduced. The control logic 45 can optionally provide an indication of this non-uniformity to the operator.

Hence it can be seen that some embodiments provide a device which transforms a time-pressure dispensing apparatus into a volumetric apparatus which is operable to measure a volume discharged from the syringe 130. This is achieved using the linear position sensor 160 which records the dynamics of the piston 250 inside the syringe 130 and the time history of the piston dynamics is processed and correlated for volume calculation. This enables volumetric measurements to be made with conventional time-pressure dispensers which do not need to be as large, heavy and user-unfriendly as typical volumetric dispensers. This is because typical volumetric dispensers require high rigidity for their mechanical systems in order to minimize the influence of mechanical deformation on the volumetric accuracy and repeatability. In some embodiments of the invention, the syringe 130 may instead be made of a relatively soft structure such as polypropylene, which will deform under operation. Unlike conventional volumetric dispensers, there are no extra steps needed to transfer the fluid from the syringe to a more rigid container prior to dispensing. This is because the positional data gathered can be used to separate the changing positional information due to deformation from the resultant positional information which indicates the actual amount of fluid dispensed. Such an approach allows for a closed-loop feedback control in the dispensing to correctly control the volume of fluid dispensed. This switch from open-loop control, which is typically used in time-pressure dispensing systems, to closed-loop control helps to improve the dispensed volume accuracy and repeatability. Hence, it can be seen that embodiments enable the volumetric measurements of fluid such as epoxy to be performed. This measured volume can be used as a feedback to make the adjustment and correction of fluid delivery if required. Dark fluids are also capable of being measured, which cannot be easily measured optically due to their poor reflective surface.

Although the present invention has been described in considerable detail with reference to certain embodiments, other embodiments are possible.

Therefore, the spirit and scope of the appended claims should not be limited to the description of the embodiments contained herein.

The invention claimed is:

1. A device for measuring and regulating a volume of a fluid dispensed by a time-pressure dispenser, the device comprising:
    an adaptor for releasably coupling a syringe to the device, the syringe containing a fluid to be dispensed;
    a probe configured to be coupled with a piston of the syringe, the piston being operative to apply a pressure for ejecting the fluid from the syringe upon the application of an air pressure to the piston; and
    a displacement detector operative in use to determine a position of the probe so as to determine a position of the piston when dispensing the fluid for measuring a displacement of the piston occurring during a respective dispensing operation, whereby to measure and regulate the volume of the fluid dispensed from the syringe.

2. The device of claim 1, wherein the probe is configured to be coupled towards one end of the piston distal from a nozzle of the syringe.

3. The device of claim 1, wherein the probe is in releasable engagement with the piston.

4. The device of claim 1, wherein the probe is operative in use to displace linearly in tandem with the piston.

5. The device of claim 1, wherein the probe carries one of a displacement encoder and a displacement scale.

6. The device of claim 5, wherein the probe is movably housed within a housing which carries another of the displacement encoder and the displacement scale.

7. The device of claim 5, wherein the displacement detector is operative in use to measure a displacement of the probe in response to displacement of the displacement encoder with respect to the displacement scale.

8. The device of claim 5, wherein the displacement encoder is a linear displacement encoder and the displacement scale is a linear displacement scale.

9. The device of claim 1, comprising processing logic operative in use to record an indication of the displacement over time of the probe when the piston is dispensing the fluid as a displacement characteristic.

10. The device of claim 9, wherein the processing logic is operative in use to determine the volume of the fluid dispensed by the syringe based on a difference between an initial position of the probe prior to the fluid being dispensed by the syringe and a resultant position of the probe after the fluid has been dispensed by the syringe.

11. The device of claim 9, wherein the processing logic is operative in use to compare a displacement characteristic of the probe with a pre-stored displacement characteristic of the probe in relation to a typical dispensing cycle.

12. The device of claim 11, wherein the processing logic is operative in use to detect a dispensing irregularity when the displacement characteristic of the probe varies from the pre-stored displacement characteristic of the probe.

13. The device of claim 1, further comprising a housing having an actuator operative in use to apply an air pressure on the probe, so as to apply a further pressure to the piston for ejecting the fluid from the syringe.

14. A fluid dispensing apparatus, comprising a time-pressure dispenser operative in use to dispense a fluid; and the device as claimed in claim 1.

15. A method of measuring and regulating a volume of a fluid dispensed by a time-pressure dispenser, the method comprising:
    using an adaptor to couple a probe with a piston of a syringe containing a fluid to be dispensed;
    applying an air pressure to the piston so as to apply a pressure on the fluid for ejecting the fluid from the syringe; and
    measuring and regulating the volume of the fluid dispensed from the syringe by determining a displacement of the probe with a displacement detector so that a position of the piston when the piston is dispensing the fluid may be determined, for measuring a displacement of the piston occurring during a respective dispensing operation.

16. The method of claim 15, comprising recording an indication of the displacement over time of the probe when the piston is dispensing the fluid.

17. The method of claim 15, comprising determining the volume of the fluid dispensed by the syringe based on a difference between an initial position of the probe prior to the fluid being dispensed by the syringe and a resultant position of the probe after the fluid has been dispensed by the syringe.

18. The method of claim 15, comprising comparing a displacement characteristic of the probe with a pre-stored displacement characteristic of the probe in relation to a typical dispensing cycle.

19. The method of claim 18, comprising detecting a dispensing irregularity when the displacement characteristic of the probe varies from the pre-stored displacement characteristic of the probe.

20. The method of claim 18, comprising recording the displacement characteristic providing an indication of the displacement of the probe with time during displacement of the piston when dispensing the fluid.

* * * * *